US006828929B2

United States Patent
Barbella et al.

(10) Patent No.: US 6,828,929 B2
(45) Date of Patent: Dec. 7, 2004

(54) TECHNIQUE FOR NON-COHERENT INTEGRATION OF TARGETS WITH AMBIGUOUS VELOCITIES

(75) Inventors: Peter F. Barbella, Littleton, MA (US); Tamara L. Franz, Billerica, MA (US); Barbara E. Pauplis, Carlisle, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/354,511

(22) Filed: Jan. 30, 2003

(65) Prior Publication Data

US 2004/0150552 A1 Aug. 5, 2004

(51) Int. Cl.[7] .......................... G01S 13/58; G01S 13/08
(52) U.S. Cl. ...................... 342/109; 342/112; 342/146; 342/196
(58) Field of Search ................................ 342/196, 109, 342/112, 119, 128, 129, 146, 200

(56) References Cited

U.S. PATENT DOCUMENTS

| 4,914,441 | A | | 4/1990 | Brookner |
| 5,235,338 | A | * | 8/1993 | Hsiao et al. ................ 342/109 |
| 5,245,347 | A | | 9/1993 | Bonta et al. |
| 5,627,545 | A | | 5/1997 | Van Genderen et al. |
| 5,748,140 | A | | 5/1998 | Schober |
| 5,943,003 | A | | 8/1999 | Shollenberger |
| 6,078,281 | A | | 6/2000 | Milkovich et al. |
| 6,232,912 | B1 | | 5/2001 | Nagel |
| 6,271,787 | B1 | | 8/2001 | Springer et al. |
| 6,313,785 | B1 | * | 11/2001 | Mattox ........................ 342/106 |
| 6,437,729 | B1 | * | 8/2002 | Mattox ........................ 342/106 |
| 6,664,920 | B1 | * | 12/2003 | Mott et al. ................... 342/129 |

FOREIGN PATENT DOCUMENTS

| EP | 0 709 694 A1 | 10/1995 |
| WO | WO 01/84179 | 11/2001 |

OTHER PUBLICATIONS

IEE Stevenage, New Approach For Doppler Ambiguities Resolution In Medium Pulse Repetition Frequency Radars, Nov. 23, 1989, pp. 17\672–1674, vol. 25, No. 24.

* cited by examiner

Primary Examiner—Bernarr E. Gregory
Assistant Examiner—Brian K Andrea
(74) Attorney, Agent, or Firm—Daly, Crowley & Mofford, LLP

(57) ABSTRACT

A method for processing pulsed-Doppler radar signals to detect a target includes transmitting radar signals from a radar system according to a predetermined frequency technique including signals having frequency diversity, receiving signals within a frequency band, including a target return signal having a frequency indicative of the velocity of the target, and transforming the target return signal using a Fourier Transform having a variable frequency scale.

28 Claims, 12 Drawing Sheets

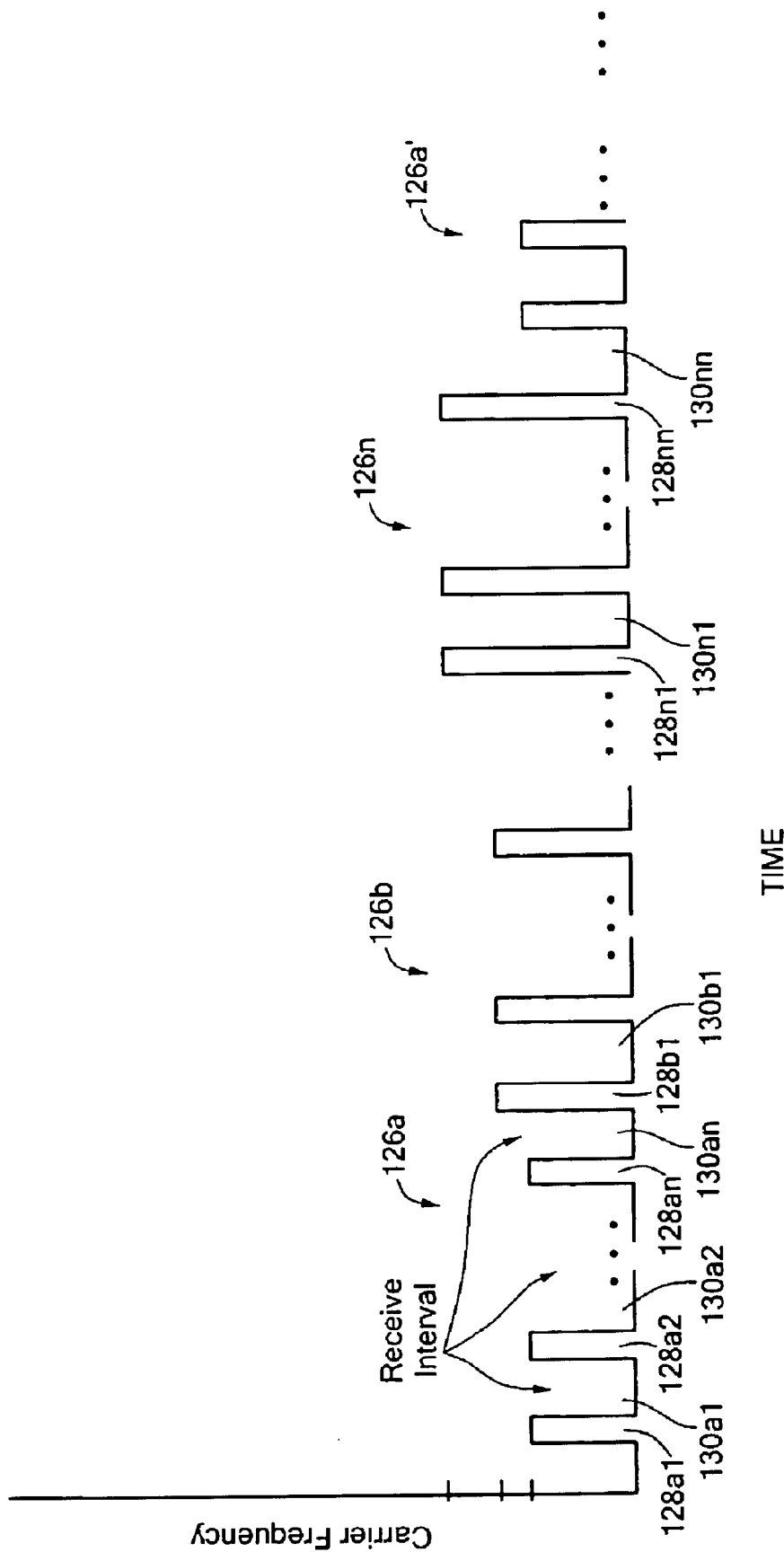

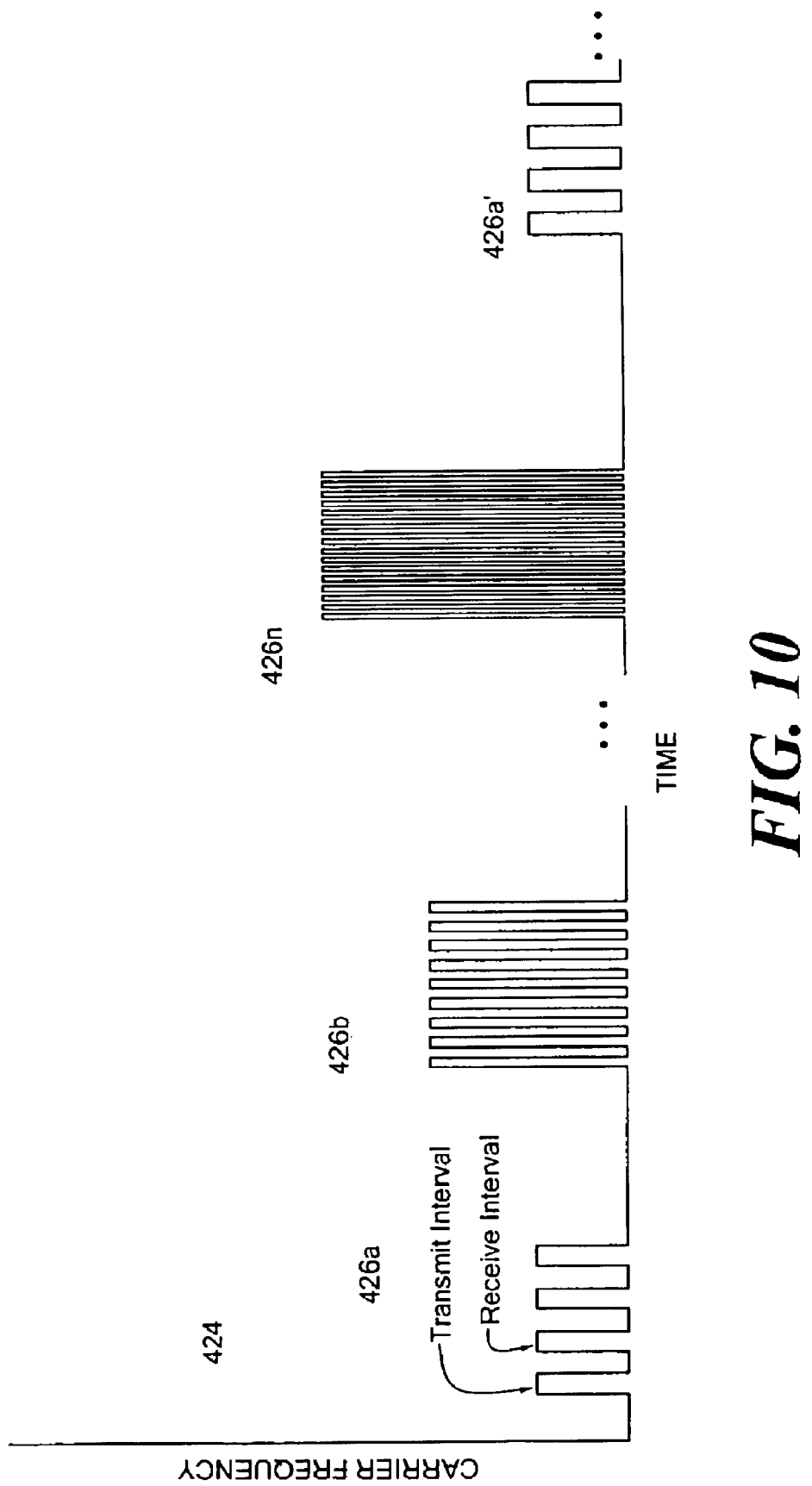

TECHNIQUE FOR NON-COHERENT INTEGRATION OF TARGETS WITH AMBIGUOUS VELOCITIES

STATEMENTS REGARDING FEDERALLY SPONSORED RESEARCH

This invention was made with Government support under Contract No. DASG60-98-C-001 awarded by the Department of the Army. The Government has certain rights in this invention.

CROSS-REFERENCE TO RELATED APPLICATIONS

Not applicable.

FIELD OF THE INVENTION

This invention relates generally to radar signal processing and more particular to an apparatus and method for determining the range and/or radial velocity of a target.

BACKGROUND OF THE INVENTION

As is known in the art, radar systems, such as pulse Doppler radar systems, are used to determine the range and/or relative velocity (i.e., Doppler velocity) of an object. Radar pulses are transmitted at a rate referred to as the pulse repetition frequency (PRF). The time interval between successive pulses is referred to as the pulse repetition interval (PRI). During a predetermined time after pulse transmission, radar return signals are sampled, or gated, by the radar system. That is, based on the difference in time between pulse transmission and the time which the sample is taken, each one of the samples corresponds to a range, or distance, between the radar system and the object producing the sampled return. The process is referred to as range gating, where each time a sample is taken represents a range cell, or gate, of the return produced by the object at the range corresponding to the time at which the sample is taken.

In applications where there is a relative velocity (i.e., Doppler velocity) between the radar system and the object, in order to track the object, the time at which the radar return sample is sampled after pulse transmission varies in relation to the relative velocity between the radar system and the object. Thus, if the object is moving away from the radar system, the time at which the radar return is sampled relative to the time the radar pulse was transmitted, must increase from radar pulse to radar pulse at a rate proportional to the relative velocity, or Doppler velocity, between the radar system and the object. In like manner, if the object is moving towards from the radar system, the time at which the radar return is sampled relative to the time the radar pulse was transmitted must decrease from radar pulse to radar pulse at a rate proportional to the Doppler velocity between the radar system and the object.

In order to determine the Doppler velocity of the object, the radar returns from a plurality of transmitted radar pulses are processed. More particularly, each set of radar returns from a plurality of consecutively transmitted radar pulses is referred to as a dwell. The radar system produces a plurality of consecutive dwells. For each dwell, the radar system determines a plurality of Doppler frequency windows at each of a plurality of contiguous range gates.

In other words, for each dwell, the radar system determines a plurality of Doppler frequency windows at each of a plurality of contiguous range gates to provide a Doppler matrix. If there are N pulses, there are N frequency windows (or bins). The number of range gates corresponds to the number of input samples taken from each PRI. If M input samples are extracted from each of the N PRIs, M discrete Fourier transforms (DFTs) are performed to produce a matrix of M ranges and N frequency windows.

Fine Doppler velocity resolution generally requires a large number of radar returns per dwell (i.e., a relatively large data collection period). For objects having relatively high Doppler velocities, this data collection period translates into a time period during which the object to radar system range can experience a large change. If the range accuracy is less than the object movement over the dwell, some type of dynamic range gate adjustment (i.e., range gate positioning system) is required in order to maintain the range to the object in the middle of each dwell and thereby enable the radar system to track the range to the object with maximum signal to noise ratio.

Various systems have used range "walk" compensation or velocity aiding techniques to move range gates during a dwell to prevent the object from passing through the "window" (i.e., time duration) of the range gate. For example, U.S. Pat. No. 5,943,003 entitled "Radar System", issued on Aug. 24, 1999, being assigned to the same assignee as the present invention and incorporated herein by reference teaches one improved technique to determine the range and/or relative velocity of a target. In pulsed radar applications, it is often desirable to use dwell integration and radio frequency signals having wide frequency diversity, i.e. using radar signals having a carrier frequency which varies over a wide frequency range to determine the range and radial velocity of a target. It is also desirable to use pulse compression techniques to direct additional energy at the target using longer signal pulses while retaining the resolution of shorter pulses. Radar signals are transmitted as a series of pulses, and each of these pulses along with a time interval allocated to receive the return signals form a coherent processing interval (CPI). Each CPI can use different carrier frequencies with a dwell period or dwell cycle being described as a sequence of CPIs. Multiple DFTs of received signals during each CPI are commonly employed as a means to enhance target signal to interference ratios. The transforms are, however, difficult to mathematically integrate. The radio frequency (RF) shifts among the CPIs cause the target's Doppler frequency to vary. During processing the received signals are sorted by frequency into a plurality of filter bins and assigned a filter bin number. When frequency diversity (i.e. varying the carrier frequency of the series of pulses) is used to detect targets with conventional processing techniques, the variation in Doppler frequency due to different carrier frequencies is referred to as bin shift.

For a pulsed-Doppler radar, it is difficult to non-coherently integrate range—Doppler matrices of different carrier frequencies because the Doppler bins align in frequency and not in terms of the parameter to be measured, for example the incoming velocity. Therefore, algorithms are required to determine how values in the various Doppler bins should be non-coherently added. This alignment problem is generally referred to as a "bin shift" problem. Additionally, the Doppler response is cyclic, depending on the dwell time and the radar pulse repetition frequency (PRF). This can lead to a Doppler ambiguity for a target since the aliases are measured along with the true Doppler when using a high PRF. Adding a Doppler phase correction is sometimes desired in processing the radar signals, and not knowing the correct ambiguous Doppler signal leads to an incorrect phase correction which can cause range-rate and range errors. Conventional systems require post-processing techniques to correct bin shift problems in order to provide non-coherent integration (NCI), Other problems such as target spread remain after post processing and required complicated phase correction techniques for pulse compression exist in conventional systems.

It would therefore be desirable to enhance signal detectability by non-coherent integration without the need for extensive post processing of the radar return signals to align signal Doppler frequencies.

SUMMARY OF THE INVENTION

In accordance with the present invention, a method for processing pulse Doppler radar signals to detect a target includes transmitting radar signals from a radar system having a predetermined varying frequency, receiving signals within a frequency band, including a target return signal having a frequency indicative of the velocity of the target, and transforming the target return signal using a Fourier transform having a variable frequency scale. With such a technique, signal detectability is enhanced by non-coherent integration without the need for extensive post processing of the radar return signals to align signal Doppler frequencies. The inventive technique takes advantage of integrating multiple dwells to achieve higher sensitivity and uses frequency diversity to enhance target cross section and mitigate RF multipath interference. This technique solves the bin shift problem by effectively changing the DFT equation. The modified equation results in a "Target Velocity" normalized version of the signal's spectral content, thus lining up the target return in the same DFT bin for each RF carrier frequency used.

In accordance with a further aspect of the present invention, the technique further includes aligning a radial velocity matrix for non-coherent integration, identifying a plurality of detections which occur from Doppler aliases, and removing Doppler aliases from the plurality of detections. With such a technique, velocity ambiguities in systems using relatively high PRFs are resolved. The modified technique Fourier transforms the plurality of detections into radial velocity space, which can be set for any desired minimum and maximum limits. Radial velocities appear in the range/Doppler matrix cyclically with different periods for different carrier frequencies. Only at the correct range-rate will the received signals align. Any detections which occur from Doppler aliases are identified and removed from a detection list. Since the range of the desired range-rates, both minimum and maximum, are not limited in this process, the unambigous range-rate zone is limited only by processing time. Therefore, any Doppler phase correction can be made for the correct Doppler, reducing the resultant range and radial velocity errors.

In one embodiment, the modified DFT technique transforms time samples into radial velocity space instead of Doppler frequency space. The resulting range by radial velocity matrices are pre-aligned for non-coherent integration. The limits of the radial velocity are not restricted by the time of the dwell or the number of pulses in the coherent processing interval (CPI). Radial velocity ambiguity resolution is directly determined. Additionally, any Doppler phase correction that is applied is applied in the correct unambiguous Doppler region, reducing the possible range and radial velocity errors.

BRIEF DESCRIPTION OF THE DRAWINGS

The foregoing features of this invention, as well as the invention itself, may be more fully understood from the following description of the drawings in which:

FIG. 3 is a diagram of an exemplary transmitted radar signal showing transmit signals for multiple CPIs having frequency diversity and the corresponding receive intervals;

FIG. 10 is a diagram of an alternative exemplary transmitted radar signal of the signal in FIG. 3, showing transmit signals for multiple CPIs having frequency diversity and multiple PRFs, and the corresponding receive intervals.

DETAILED DESCRIPTION OF THE INVENTION

Before providing a detailed description of the invention, it may be helpful to define some of the terms used in the description. As used herein, a coherent processing interval (CPI) is the time for the radar system to transmit a series of pulses transmitted at a predetermined carrier frequency and a predetermined pulse repetition frequency (PRF) and the time to receive a corresponding return signal from objects reflecting the pulses. Non-coherent integration (NCI), as used herein, refers to the process of combining using integration of the return signals included in each of several CPIs. The signals being combined by NCI include magnitude values only and do not include any phase information. The predetermined pulse repetition frequency can be equivalently described as a pulse repetition interval (PRI) between each pair of pulses. A dwell is a predetermined amount of time wherein multiple CPIs, each CPI having a different carrier frequency, is transmitted and received by the radar system.

A "target Doppler signal" as used herein refers to a Doppler value or an element in a range—Doppler matrix as a result of processing a return signal from a target using a filter bank or equivalently a discrete Fourier transform (DFT). When processed with the inventive modified DFT the term "target radial velocity signal" refers to a radial velocity value in a range-radial velocity matrix. A "target signal" as used herein refers to a discernable element in a set of elements resulting from processing a return signal from a target using a filter bank, or equivalently, a discrete Fourier transform (DFT).

Figure 1:
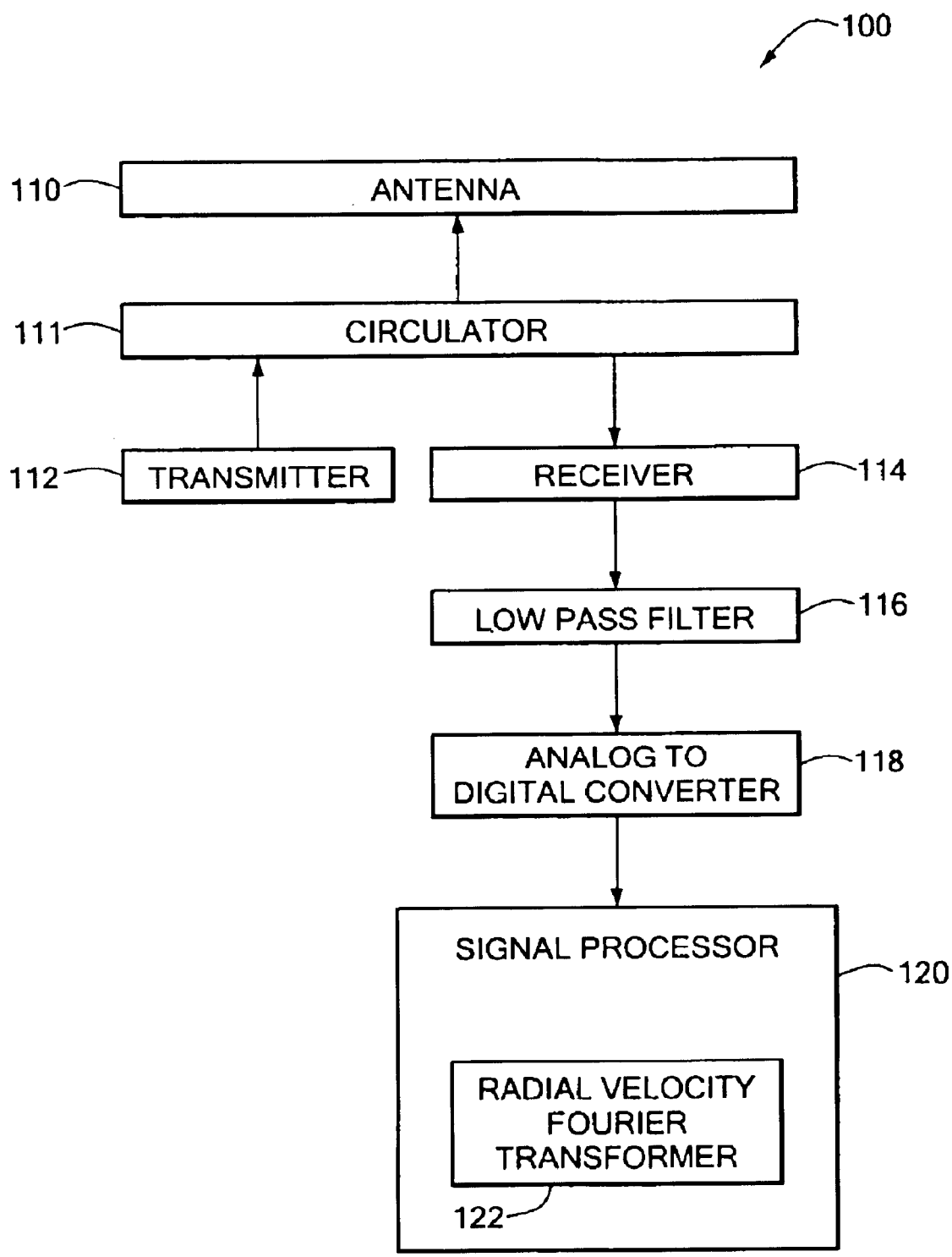
FIG. 1 is a block diagram of a radar system according to the invention.

Referring now to FIG. 1, an exemplary pulse Doppler radar system 100 includes an antenna 10 coupled to a transmitter 112 and a receiver 114. The system 100 further includes a low pass filter 116 coupled to the receiver 114, an analog to digital converter 118 coupled to the low pass filter 116, and a signal processor 120 coupled to the analog to digital converter 118. The signal processor 120 includes a radial velocity fast Fourier transform (FFT) transformer 122. The antenna 110 is selectively coupled to the transmitter 112 or the receiver 114 by circulator 111 using known techniques. One purpose of the circulator 111 is to prevent direct coupling between the transmitter 112 and the receiver 114.

The radial velocity FFT transformer 122 is a replacement for a conventional Doppler frequency FFT transformer and operates as described hereinafter. In one embodiment, the radial velocity FFT transformer 122 provides a modified DFT given by the following:

$$X_p(k) = \sum_{n=0}^{N-1} x_p(n) e^{\left(\frac{-2\pi j n k d_i}{N}\right)}$$ (Equation 1)

where:

$$d_i = \frac{\lambda_0}{\lambda_i};$$

$\lambda_0$ is a predetermined wavelength;
$\lambda_i$ is the wavelength of the pulses which comprise CPI # i;
N is the number of pulses processed within one CPI;
k is the frequency increment index;
p is the time sample index of the digitized receive signal;
$X_p(k)$ is the amount of signal return energy in a frequency bin of k*PRF/N; and
$x_p(n)$ is the time domain received signal, at time sample p, PRI i.

The frequency increment index, k, is limited in Equation 1, to the number of pulses processed within one CPI, here equal to N.

In operation, the desired transmission frequencies are selected. Wavelength, $\lambda_0$ is assigned to the highest frequency. A CPI's interval of pulses is transmitted at this highest frequency, and the system 100 processes the data normally, first in range, and then with the FFT of equation 1 (i.e. $d_i=1$). The next frequency, having wavelength, $\lambda_i$ forms the ratio:

$$d_i = \frac{\lambda_0}{\lambda_i}.$$

A second CPI is processed to derive a new set of range—radial velocity cells. It is understood that the variable wavelength scaling factor $d_i$ is equivalent to a corresponding frequency scaling factor because of the inverse relationship between wavelength and frequency.

This method has the advantage of normalizing the data, exactly during processing. Data post processing (such as would be required with sorting or interpolative routines) is not necessary. Note in this embodiment, if target Doppler frequency exceeds the radar PRF, the transform outputs will no longer align.

A further refinement in the transform provides multiple Doppler cycles to handle the problem of ambiguous velocities. The following transformation normalizes any target with ambiguous velocity of order M:

$$X_p(k) = \sum_{n=0}^{N-1} x_p(n) e^{-2\pi j M d_i n} e^{\left(\frac{-2\pi j n k d_i}{N}\right)}$$ (Equation 2)

where:

$$d_i = \frac{\lambda_0}{\lambda_i}$$

M=the order of target velocity ambiguity (any positive or negative integer);
M is used because there is a limit on the maximum and minimum values for k.
M takes integer values as described in conjunction with FIG. 2 according to the following equation:

$$M = \frac{2vTd_i}{\lambda_0} - k\frac{d_i}{N} + M[1 - d_i]$$ (Equation 3)

N is the number of pulses per CPI;
k is the frequency increment index;
n is the PRI index; and
$x_p(n)$ is the time domain received signal, at time n, PRI for CPI i.

It should be noted that the i in subscript the term $d_i$ is reserved for the different dwells.

Figure 2:
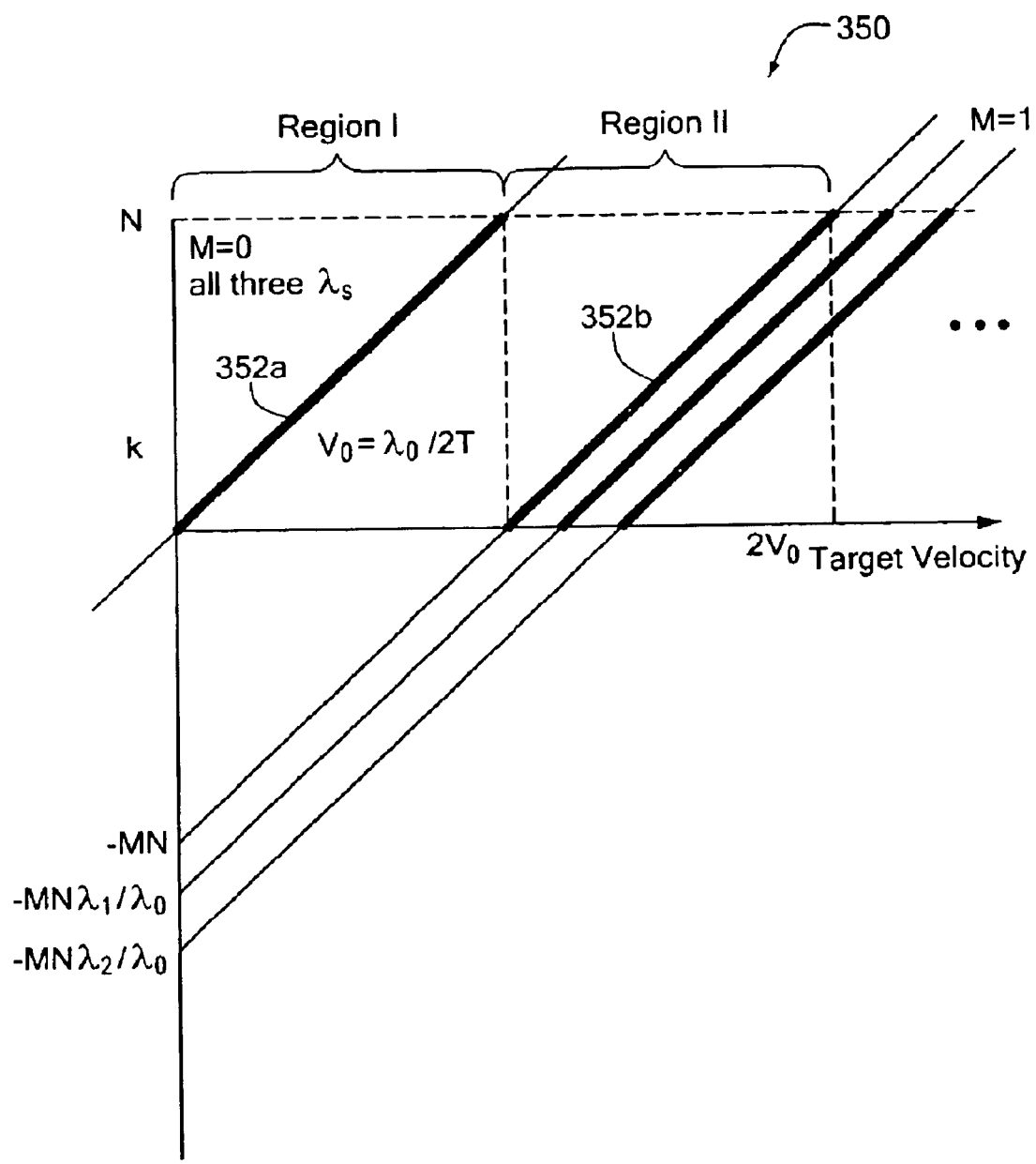
FIG. 2 is a graph of a set of curves showing the cyclic ambiguous velocities processed return signal according to the invention.

Now referring to FIG. 2, a diagram 350 including a plurality of families of curves 352a, 352b–352m illustrates how the transform of Equation 2 aligns the transform outputs for any target Doppler. When multiple radar data dwells are executed each having a different wavelength, $\lambda_i$, the transform of Equation 1 normalizes target velocities that have Doppler frequencies less than the chosen radar PRF. In the transform of Equation 1, $\lambda_0$ is the shortest wavelength employed in the radar. It will be appreciated by those of ordinary skill in the art that there are varying choices for $\lambda_0$ depending on the system requirements of the radar system.

An input sequence representing a target with an arbitrary velocity, v, can be modeled as:

$$x_i(n) = e^{\left(2\pi j \left[\frac{2v}{\lambda_i}\right] nT\right)}$$ (Equation 4)

T ≡ Radar Pulse Repetition Interval

When this model of the input signal is substituted into the basic transform of Equation 1, the result is:

$$X_i(k) = \sum_{n=0}^{N-1} e^{\left(2\pi j \left[\frac{2v}{\lambda_i}\right] nT\right)} e^{\left(\frac{-2\pi j n k d_i}{N}\right)}$$ (Equation 5)

It can be shown that $X_i(k)$ has major peaks when:

$$2\pi\left[\frac{2vT}{\lambda_i} - \frac{kd_i}{N}\right] = 2\pi M \quad \text{(Equation 6)}$$

$M \equiv$ any positive or negative integer

This equation can be expressed by:

$$k = \frac{N}{d_i}\left(\frac{2vT}{\lambda_i} - M\right) \quad \text{(Equation 7)}$$

This equation shows the filter number, k, which will contain maximum signal energy for an arbitrary velocity, v. Note that it is the equation of a family of straight lines, dependent not only on the target velocity, v, but also on the radar wavelength, $\lambda_i$, and the integer M, which we will see is the order of target velocity ambiguity. Recalling that $$d_i = \frac{\lambda_0}{\lambda_i}$$

the equation is simplified to:

$$k = \frac{2vTN}{\lambda_0} - M\frac{N}{d_i} \quad \text{(Equation 8)}$$

In this form, the slope of the straight line has become constant, regardless of which radar wavelength is used.

In the example of FIG. 2, three radar dwells are used having the following three distinct wavelengths:

$\lambda_0 = 0.03$ meters (10 GHz)
$\lambda_1 = 0.0333$ meters (9 GHz)
$\lambda_2 = 0.0375$ meters (8 GHz)

The family of curves, for these distinct wavelengths and several values of M, is illustrated in FIG. 2. Each equation is valid only in the region for which:

$0 \leq k \leq N-1$.

The family of curves for M=0 collapses to one curve. The region of validity extends from 0 mps to $$v = \frac{\lambda_0}{2T} \equiv v_0.$$

Therefore the modified transform:

$$X_i(k) = \sum_{n=0}^{N-1} x_i(n)e^{\left(\frac{-2\pi jnkd_i}{N}\right)} \quad \text{(Equation 9)}$$

normalizes targets with velocities within the first the velocity ambiguity, $v_0$ (region I having slow target velocities).

For M=1, there is a second family of curves. This time, the curves are distinct for each wavelength, $\lambda_i$. The three curves for M=1 are parallel, but each has a distinct ordinate crossing at $$-MN\frac{\lambda_i}{\lambda_0}.$$

If a target's velocity lies in region II, $v_0 \leq v \leq 2v_0$, then the number of the peak energy target filter (i.e., bin) changes for each radar dwell. The result is that these signal transformations could not be simply added to integrate the one target.

In order to integrate these signal transformations, the curves must be shifted for M=1, so that they coincide. By inspection of the M=1 family of curves it is understood that each curve needs to be shifted up by an amount $$MN\left[\frac{1}{d_i} - 1\right].$$

While the original equation for k is:

$$k = \frac{2vTN}{\lambda_0} - M\frac{N}{d_i} \quad \text{(Equation 10)}$$

The shifted amount is added to provide:

$$k = \frac{2vTN}{\lambda_0} - M\frac{N}{d_i} + MN\left[\frac{1}{d_i} - 1\right] \quad \text{(Equation 11)}$$

This equation is transformed to resemble the original phase angle equation, Equation 10, for maxima i.e., the maximum of the signal values for each detection, by multiplying by $d_i/N$ and rearranging terms to provide M as indicated in Equation 3. The term $e^{-2\pi jMd_i}$ (also referred to as the DFT phasor) is added to the transform as a weighting function imposed on each sample of the input sequence. Therefore the transformation of Equation 1 and Equation 2 normalizes any target with ambiguous velocity of order M by applying a phase shift weighting function on the received signals such that the DFT phasor is aligned in different regions of the velocity domain.

In an alternate embodiment, the radial velocity FFT transformer 122 provides a DFT derived from the following:

$$\Psi_{p,k} = \sum_{n=1}^{N} \psi_{p,n} e^{-i2\pi\left(\frac{n-1}{N}\right)T(k-1)\Delta f^d} \quad \text{(Equation 12)}$$

Equation 12 includes the time of the CPI, T, and the Doppler phase incremental value, $\Delta f^d$. The standard condition that $T\Delta f^d_{max}=1$ is imposed on Equation 3, the relationship between the $\Delta f^d$'s is shown, which provides the following:

$$\Psi_{p,k,m} = \sum_{n=1}^{N} \psi_{p,n,m} e^{-i2\pi\left(\frac{n-1}{N}\right)(k-1)\left(\frac{\lambda_{min}}{\lambda_m}\right)} \quad \text{(Equation 13)}$$

where:

n is the pulse repetition interval (PRI) index;

m is the CPI index;

N is the number of pulses in a CPI;

k is the frequency increment index;

p is the time sample index;

$\Psi_{p,n,m}$ is the frequency domain of a function, with time index p, frequency index k and CPI index m; and $\psi_{p,n,m}$ is the time domain received signal, at time sample index p, pulse index n, and CPI index m.

In Equations 12 and 13, the limits for k are specified based on the desired radial velocity range and therefore the term M as used in equation 2 is not required. Limits on k, $k_{min}$ and $k_{max}$ are defined in Equations 14 and 15. The minimum and maximum values of k, for each frequency in the NCI, are then determined by the frequency independent equations:

$$k_{min} \le \frac{\dot{r}_{min}}{\Delta \dot{r}} \quad \text{(Equation 14)}$$

$$k_{max} \ge \frac{\dot{r}_{max}}{\Delta \dot{r}} \quad \text{(Equation 15)}$$

It should be noted that Equations 12 and 13 use different notation here than in the embodiment of Equations 1 and 2. In Equations 12 and 13 $\Psi$ is used instead of X. Equations 12 and 13 use both the CPI index and the time or frequency index as subscripts instead of as variables. It will be appreciated by those of ordinary skill in the art that there are several equivalent methods to express and to practice the inventive modification to the standard DFT. The embodiments using Equations 1 and 2, and Equations 12 and 13 are only two examples of using a discrete Fourier Transform having a variable frequency scale.

The term:

$$\left(\frac{\lambda_{min}}{\lambda_m}\right) \quad \text{(Equation 16)}$$

in this FFT provides Doppler Frequency normalization for multiple radar CPIs, each taken at a different carrier frequency. The normalization simplifies the identification and "integration" of the resulting radar data.

A range-rate cell size used by all the carrier frequencies in the dwell is initially determined. The Doppler frequency, $f^d$, is a function of the range-radial velocity, $\dot{r}$, and the operating frequency, $c/\lambda$. Using the convention that an incoming range-rate has a positive value:

$$f^d = 2\frac{\dot{r}}{\lambda} \quad \text{(Equation 17)}$$

the Doppler frequency increment (cell size) is related to the range-rate cell size by:

$$\Delta f^d = 2\frac{\Delta \dot{r}}{\lambda} \quad \text{(Equation 18)}$$

The $\Delta \dot{r}$, which is be used for all frequencies in the NCI, using the maximum frequency (minimum wavelength) in the NCI set is determined according to the equation:

$$\Delta \dot{r} = \frac{\Delta f^d \lambda_{min}}{2} \quad \text{(Equation 19)}$$

where $\Delta f^d$ is the standard Doppler frequency spacing:

$$\Delta f^d = \frac{1}{T} \quad \text{(Equation 20)}$$

and T is the Coherent Processing Interval (CPI) time.

Now referring to FIG. 3, an exemplary transmitted radar signal 124 includes a plurality of successive burst sequences 126a–126n (generally referred to as burst sequences 126) including a plurality of transmit pulses 128al–128nn and a plurality of corresponding receive intervals 130al–130nn following each of the plurality of transmit pulses 128al–128nn. In one embodiment, each burst sequence has a common pulse repetition frequency (PRF) at which the pulses 128al–128nn are transmitted. The burst sequences 126a–126n are also referred to as a dwell cycle. Each burst sequence 126a, for example, including the transmit pulses 128al–128an and receive intervals 130al–130an is referred to as a CPI. Note burst sequence 126a' represents the initial burst sequence of a subsequent dwell cycle. As shown in FIG. 3, burst sequence 126a has a PRF and a first frequency, burst sequence 126b has the same PRF and a second frequency, and burst sequence 126n has the same PRF and a different third frequency for providing frequency diversity.

Figure 3A:
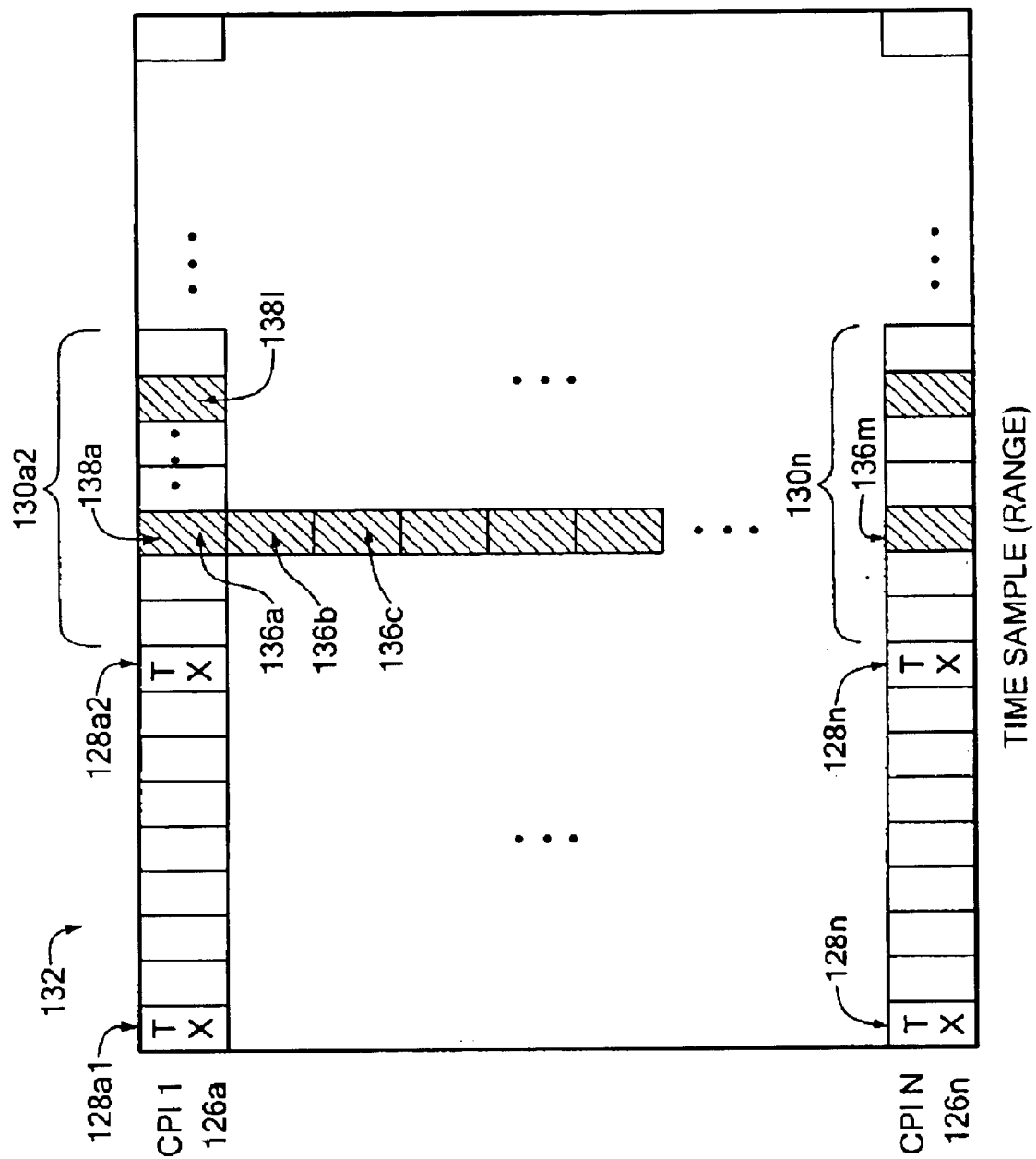
FIG. 3A is a diagram of successive CPIs showing transmitted signals and received return signals.

Now referring to FIG. 3A in which like reference designations of FIG. 3 refer to like elements, a dwell pattern 132 can include a plurality of return signals 138a–138l (generally referred to as target return signals 138) in the each of the plurality of receive intervals 130 associated with each of the corresponding to burst sequences 126a–126n. The return signals 138 are provided by the transmit pulses 128al–128nn of each CPI of the transmitted radar signal 124 reflecting from an object plus noise. The dwell pattern 132 includes a series of successive CPIs 1-N corresponding to burst sequences 126a–126n. CPI 1 includes a series of transmitted signals 128al–128an each followed by corresponding receive intervals 130al–130an in which return signals from targets and other objects can be received. For example, intervals 130a2 includes the return signals 138a–138l some of which are a plurality of target return signals 136a–m reflected from targets and some of which are return signals from other objects above a predetermined threshold value. When reflected from a target, the target return signals 136 provide an indication of the range of the target. The dwell pattern 132 includes signals transmitted according to a predetermined frequency technique, for example, where the carrier frequency changes by a fixed amount between CPIs as shown as burst sequences 126 in FIG. 3.

Figure 4:
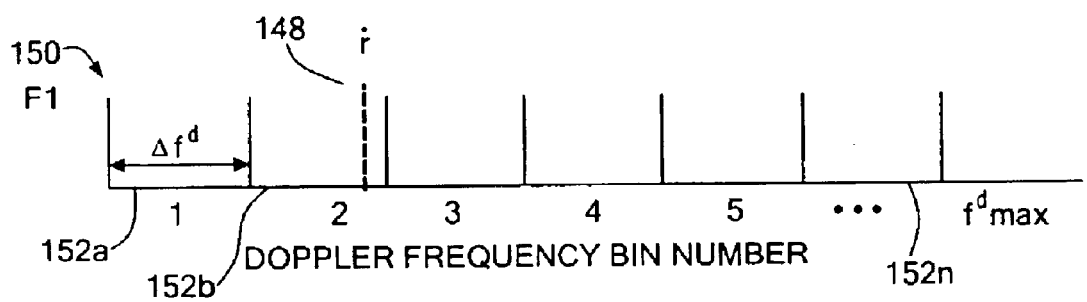
FIG. 4 is a set of Prior Art frequency bins for different carrier frequencies.
Figure 4:
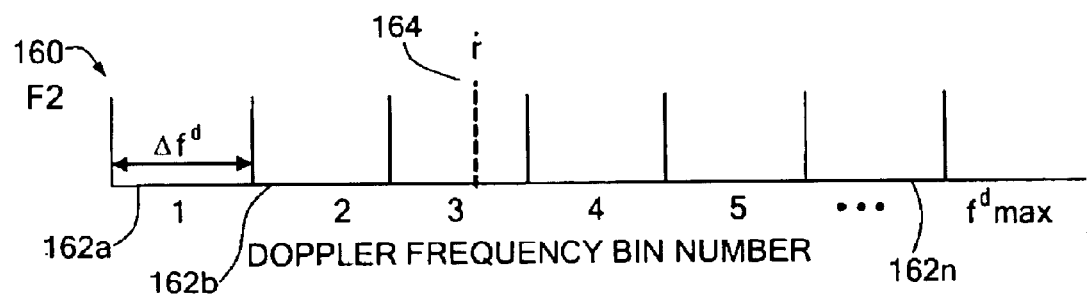

Now referring to FIG. 4, a first CPI 150 having a first carrier frequency F1 includes received signals from a target having a radial velocity of $\dot{r}$. Processing signals received during the first CPI 150 using a conventional FFT results in a spectral component 148 (generally referred to as a Doppler 148). The spectrum for frequency F1 is divided into a plurality on bins 152a–152n spaced apart at constant intervals in frequency. Here, the Doppler 148 appears in a frequency bin 152b. A second CPI 160 having a second frequency F2 includes received signals from the same target having a radial velocity of $\dot{r}$. Processing signals received during the second CPI 160 using a conventional FFT results in a spectral component 164 (generally referred to as a Doppler 164). The spectrum for frequency F2 is divided into a plurality on bins 162a–162n spaced apart at constant intervals in frequency. Here, the Doppler 164 appears in a frequency bin 162c. Although the target has a relatively constant velocity, the Doppler signals 148 and 164 resulting from spectral processing using a conventional FFT fall into different frequency bins and cannot be integrated without additional post processing.

The spectral estimates of such CPIs are difficult to integrate using conventional processing because the different RF frequencies cause the target Doppler frequency to vary. As a result, the first CPI 150 shows, for example, a target having a Doppler in frequency bin # 2 and the second CPI 160 shows the target at a different frequency bin # 3. Even if the velocity of the target is constant, the spectral lines will show up at different points on the Doppler Frequency Scale, because although the target radial velocity is constant, the velocity differs in the frequency scale for CPIs having different frequencies. For example, in FIG. 4, $\Delta \dot{r}$=1.8 $\Delta f^d$ for the first CPI 150 and $\Delta \dot{r}$=2.6 $\Delta f^d$ for the second CPI 160.

Figure 5:
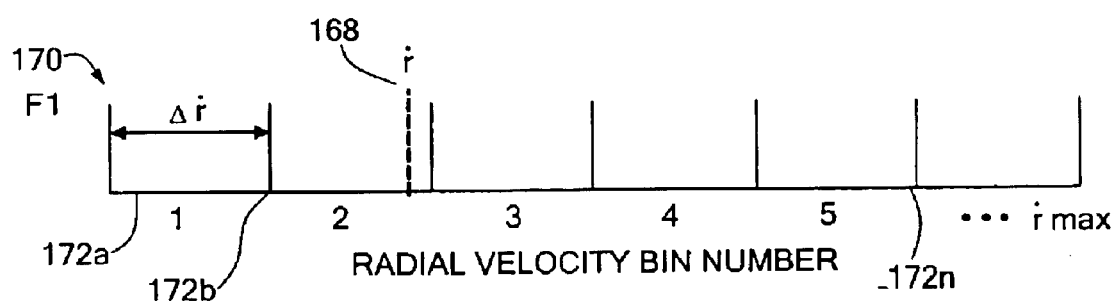
FIG. 5 is a set of constant radial velocity frequency bins for different carrier frequencies according to the invention.
Figure 5:
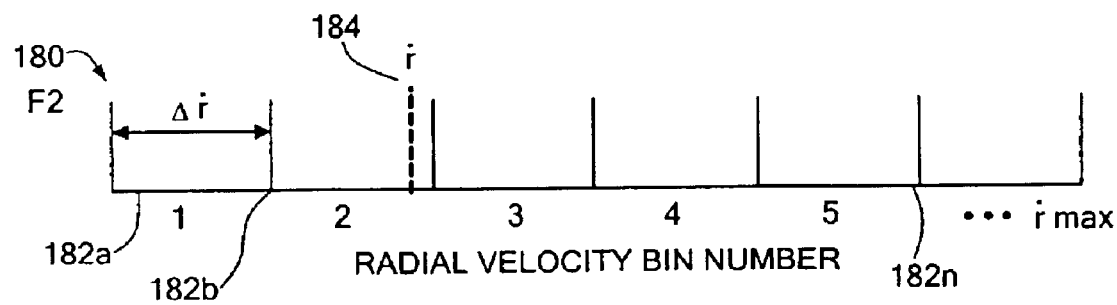

Now referring to FIG. 5, a first CPI 170 having a first frequency F1 includes received signals from a target having a radial velocity of ṙ. Processing signals received during the first CPI 170 using a radial velocity Fourier transformer 122 (FIG. 1) results in a spectral component 168 (generally referred to as a Doppler signal but here referred to as a radial velocity signal 168). The spectrum for CPI 170 having frequency F1 is divided into a plurality on bins 172a–172n spaced apart at constant intervals in radial velocity. Here, the radial velocity signal 168 appears in a radial velocity bin 172b. A second CPI 180 having a second frequency F2 includes received signals from the same target having a radial velocity of ṙ. Processing signals received during the second CPI 180 using a using a radial velocity Fourier transformer 122 results in a spectral component 184 (generally referred to as a Doppler signal but here referred to as a radial velocity signal 184). The spectrum for CPI 180 having frequency F2 is divided into a plurality on bins 182a–182n spaced apart at constant intervals in radial velocity. Here, the radial velocity signal 184 appears in a radial velocity bin 182b. Because the target has a relatively constant velocity, the radial velocity signals 148 and 164 resulting from spectral processing using the radial velocity Fourier transformer 122 fall into the same radial velocity bins and are aligned in radial velocity.

The spectral estimates of such CPIs are relatively simple to integrate using the radial velocity Fourier transformer because the Doppler signals have been frequency scaled (or equivalently normalized in radial velocity to the constant target velocity) even though the CPI frequencies vary. As a result, the first CPI 170 produces, for example, a target at radial velocity bin # 2 and the second CPI 180 also produces the target at the same radial velocity bin # 2. Because the velocity of the target is substantially constant the spectral lines will show up at the same points on the radial velocity scale, independent of the frequency scale for CPIs having different frequencies. For example, in FIG. 5 ṙ is located in the same radial velocity bin for both CPI 170 and CPI 180. Thus, the radial velocity Fourier transformer produces the desired normalized spectral estimate.

Figure 6A:
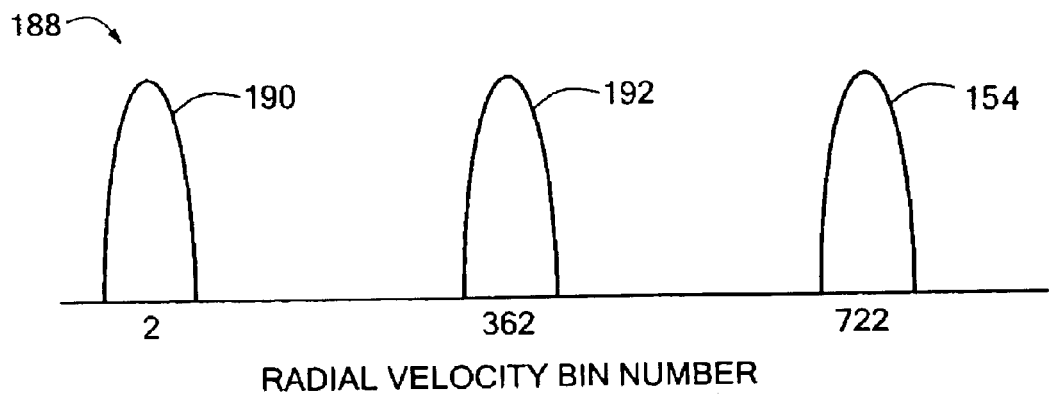
FIGS. 6A and 6B are graphs of ambiguous velocity Doppler signals sorted by radial frequency bins at two different frequencies according to the invention.
Figure 6B:
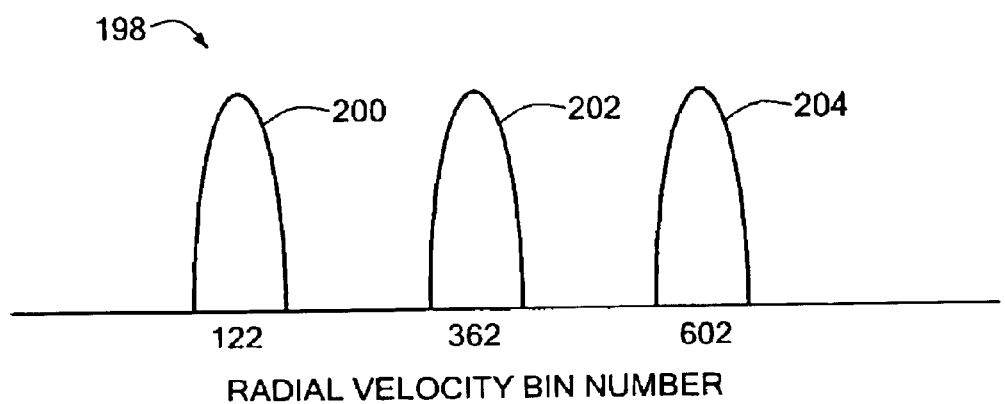
Figure 6C:
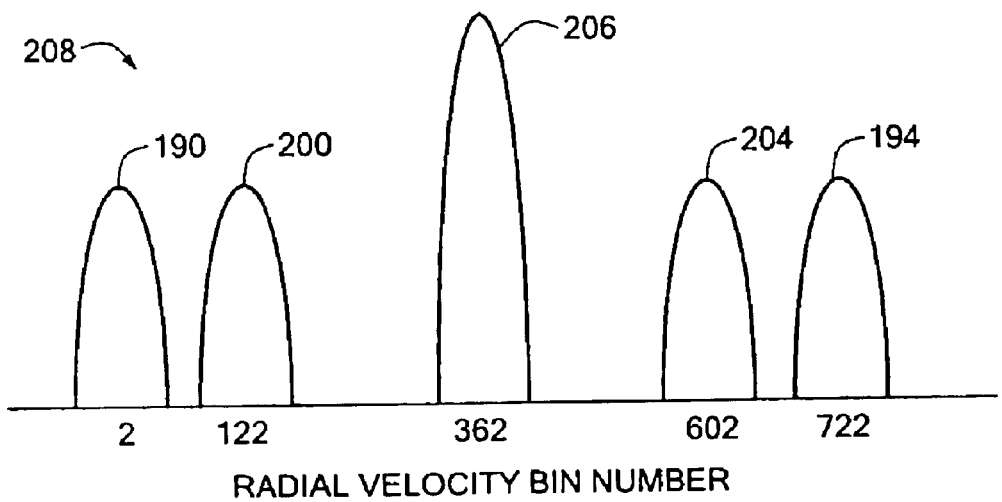
FIG. 6C is a graph of ambiguous velocity Doppler signals after non-coherent integration of the Doppler signals of FIGS. 6A and 6B.

FIGS. 6A–6C illustrate one method of eliminating the velocity ambiguity after the return signals have been processed using the by the radial velocity Fourier transformer 122 (FIG. 1). Now referring to FIG. 6A a signal 188 includes ambiguous radial velocity signals 190, 192, and 194 resulting from a first CPI sorted into radial velocity frequency bins. Here the radar data has been transformed by the radial velocity Fourier transformer 122 (FIG. 1) using an FFT similar to Equation 13. Because of the ambiguities introduced by the high PRF, the ambiguous radial velocity signals 190 and 194 appear as aliases in bins which are the radial velocity extent of a PRF apart. If the PRF at this frequency leads to 360 radial velocity bins, then the signals are in bins 2, 362, and 722. The radial velocity aliases are spaced by the number of radial velocity cells which cover a single PRF. When the signals are transformed into radial velocity, because of the different wavelengths for the different carrier frequencies, the aliases show up with different cell spacing.

Now referring to FIG. 6B, a signal 198 includes ambiguous radial velocity signals 200, 202, and 204 resulting from a second CPI sorted into radial velocity frequency bins. Here the radar data has been transformed by the radial velocity Fourier transformer 122 (FIG. 1) using an FFT similar to equation 13. Because of the ambiguities introduced by the high PRI, the ambiguous radial velocity signals 200 and 204 appear as aliases in bins which are a PRF apart, but due to the change in carrier frequency, the number of radial velocity bins are different. The radial velocity bin size has been kept constant. For this example, 140 radial velocity bins equate to a PRF, so the signals appear in bins 122, 362, and 602.

Now referring to FIG. 6C, a signal 208 illustrates the non-coherent integration of the first radial velocity signal 192 and the second radial velocity signal 202 from the CPIs of FIGS. 6A and 6B resulting in the true radial velocity 206 in bin 362 and aliases 190, 200, 204, and 194 in bins 2, 122, 602, and 722 respectively. Here, because the Doppler signals are normalized in radial velocity, the radial velocity signals can be non-coherently integrated by adding the magnitudes in each corresponding bin. The target's velocity relative to the radar can be detected by directly comparing the magnitudes in the radial velocity bins. It will be appreciated by those of ordinary skill in the art that the Doppler aliases can be identified and eliminated automatically using signal processing techniques implemented in hardware or software.

Figure 6D:
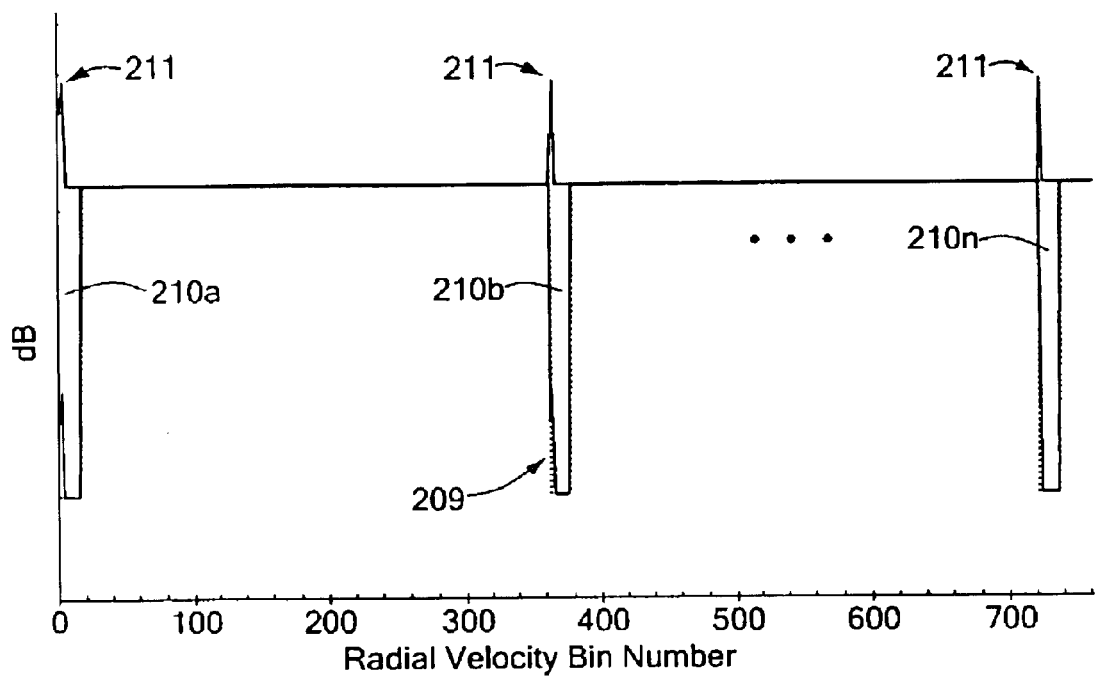
FIGS. 6D, 6E and 6F are graphs of ambiguous velocity Doppler signals filtered with a clutter notch filter and sorted by radial frequency bins according to the invention.
Figure 6E:
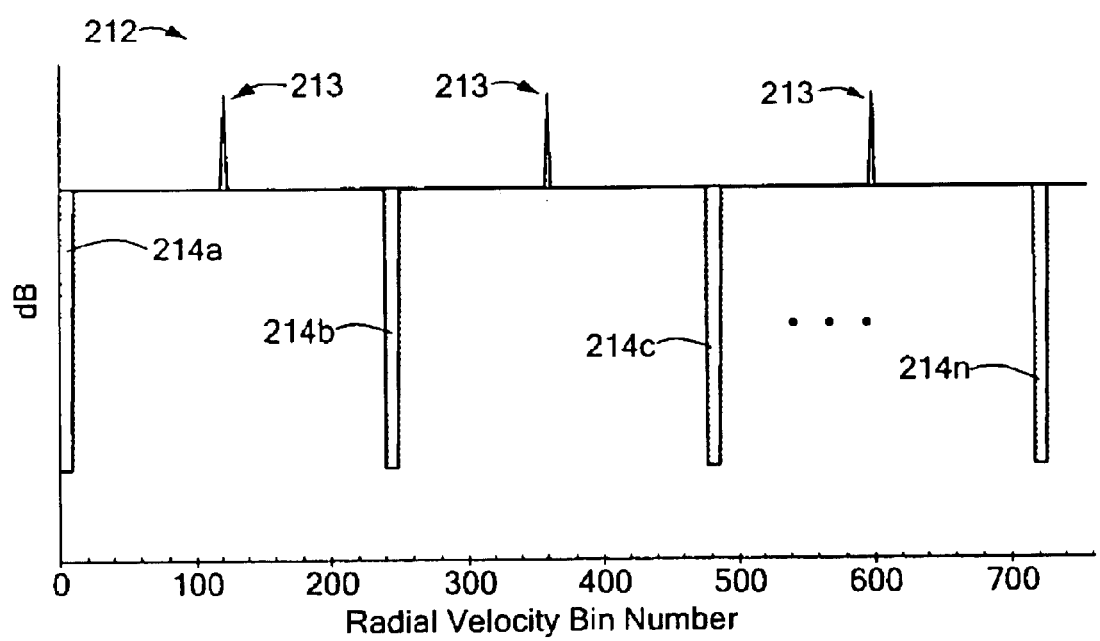
Figure 6F:
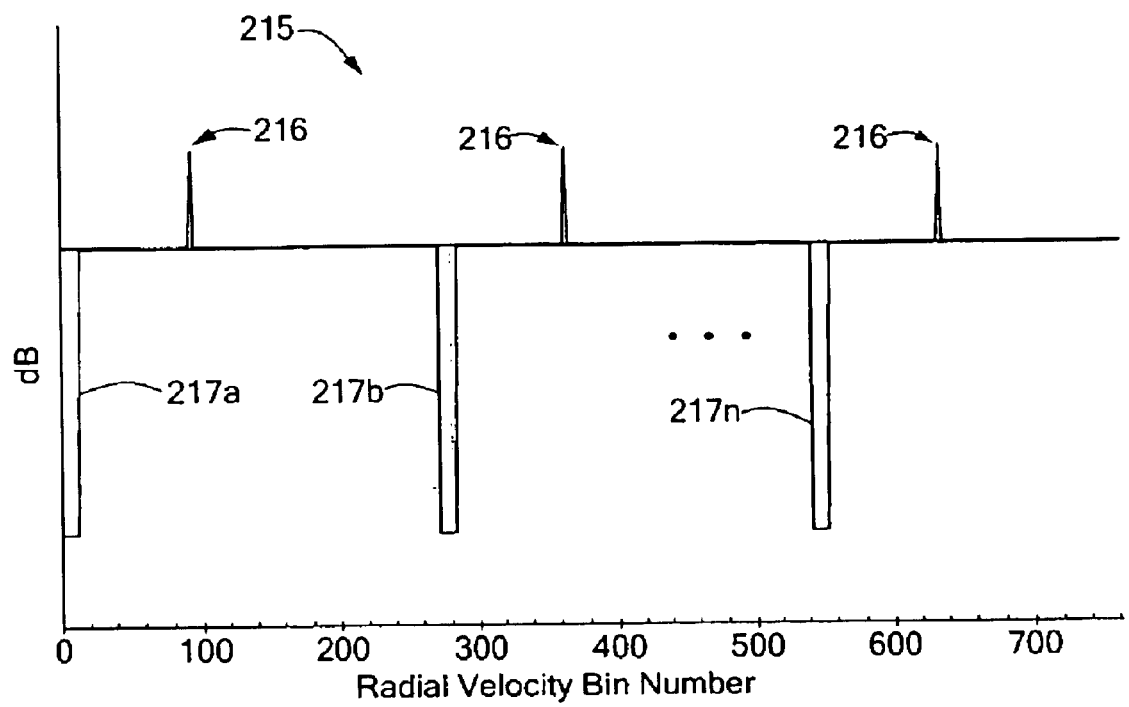

Now referring to FIGS. 6D–6F, signals 209, 212 and 215 illustrate the radial velocity signals which have been filtered with a clutter notch filter. In FIG. 6D, the clutter notch filter is illustrated by clutter filter notches 210a–210n (generally referred to as notches 210) which occur at zero and at fixed radial velocity bin intervals for a first carrier frequency. Here the notches 210 are aligned with the ambiguous radial velocity signal 211 to provide filtered ambiguous radial velocity signal 209 (shown as a dotted line). In FIG. 6E, the clutter notch filter is illustrated by clutter filter notches 214a–214n (generally referred to as notches 214) which occur at zero and at fixed radial velocity bin intervals, here spaced by approximately 240 cells, for a second carrier frequency. Here the notches 214 are not directly aligned with the returns of the ambiguous radial velocity signal 213, and provide the filtered ambiguous radial velocity signal 212.

In FIG. 6F, the clutter notch filter is further illustrated by clutter filter notches 217a–217n (generally referred to as notches 217) which occur at zero and at fixed radial velocity bin intervals, here spaced by approximately 270 cells, for a third carrier frequency. Here the notches 217 are not aligned with the ambiguous radial velocity signal 216, and provide filtered ambiguous radial velocity signal 215. When the clutter notch filtered signals 209, 212 and 215 are transformed into radial velocity, the notches 210, 214 and 217 occur with different cell spacing because of the different wavelengths for the different carrier frequencies. The carrier frequencies are chosen so that aliases of the clutter notch do not align. Therefore the notches 210, 214 and 217 do not cancel the target signal in every CPI.

Figure 6G:
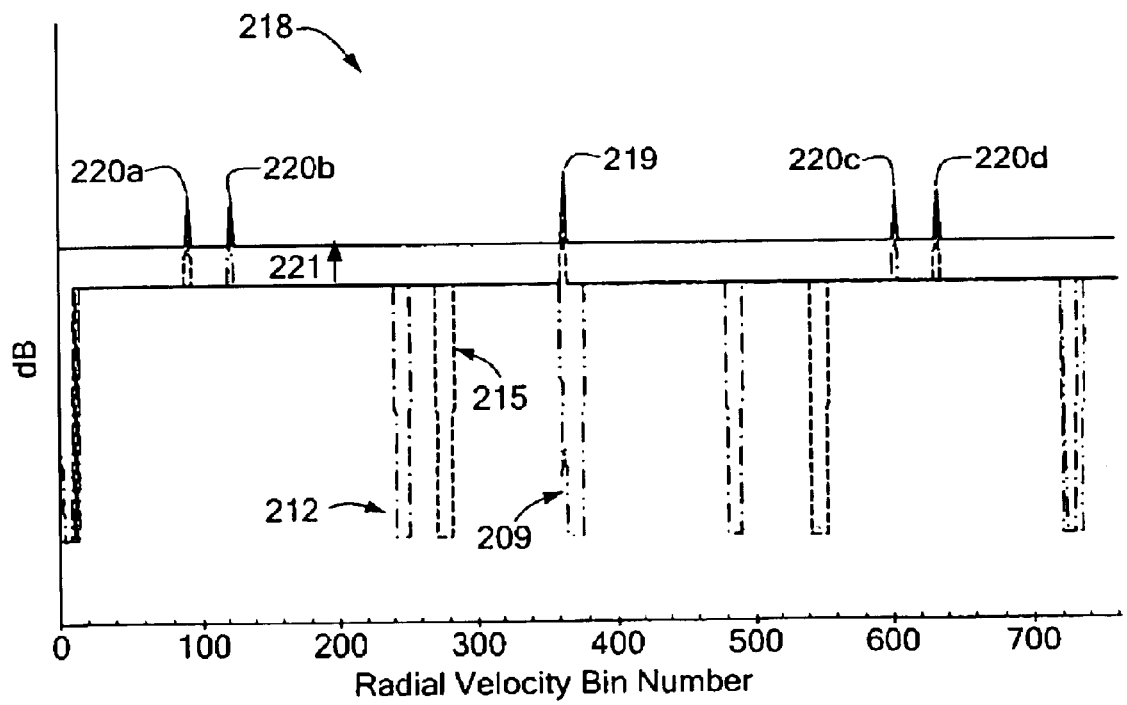
FIG. 6G is a graph of an ambiguous velocity Doppler signal resulting from the non-coherent integration of the clutter notch filtered Doppler signals of FIGS. 6D–6F.

Now referring to FIG. 6G, signal 218 illustrates the non-coherent integration of signals 209, 212 and 215 resulting in the true radial velocity 219 in bin 362 and aliases 220a–220d, approximately in bins 92, 124, 602, and 634, respectively. In FIG. 6D, the periodicity is 360 cells and the target signal is blocked by an alias of the clutter notch. In FIG. 6E periodicity is 240 cells, and the signal is not blocked by an alias of the clutter notch. In FIG. 6F the periodicity is 270 cells and again the signal is not in the alias of the clutter notch. The clutter filter notch has the same periodicity as the signal aliases. There can be multiple aliases on each side of the true signal 219 which in this example has the highest signal level. Here, because the Doppler signals are normalized in radial velocity, the effect of the clutter notch filter does not cancel the radial velocity signals in all the CPIs. The obscuration of the target return by the clutter notch alias is substantially reduced. The radial velocity signals can be non-coherently integrated after the notch filter operation by filling the clutter notches to a noise level 221, which can be determined as the local noise level in the region around the notch to remove the effect of a negative signal, and adding the magnitudes in each corresponding bin. It is noted, that there is an increase in the cumulative noise level. For FIGS. 6D–6G, approximately three Doppler zones are shown for clarity but the actual number calculated, either more or less, is based on the range of the desired target radial velocities.

Figure 7:
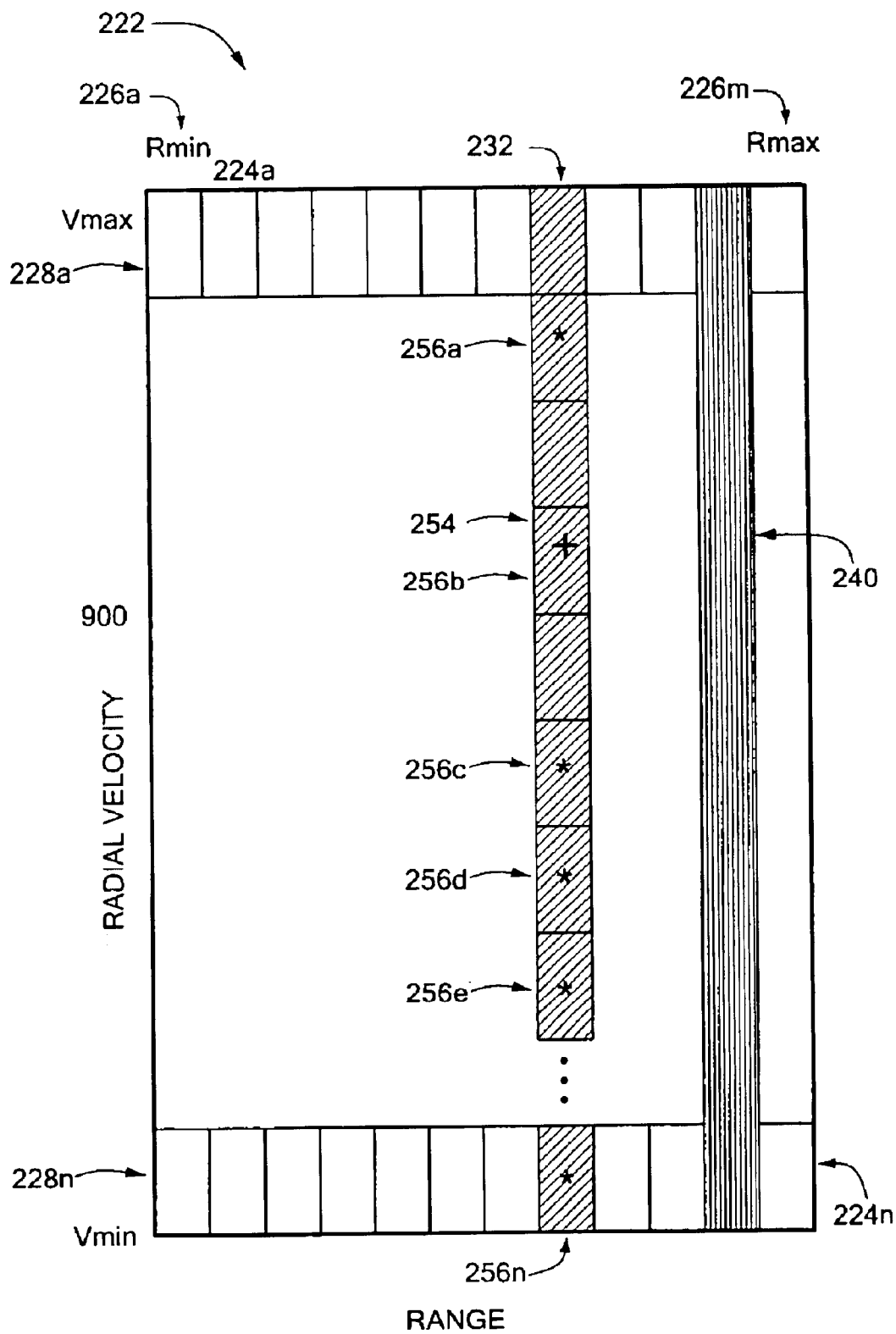
FIG. 7 is an exemplary range-radial velocity matrix according to the invention.

Now referring to FIG. 7, an exemplary range-radial velocity matrix 222 includes a plurality of cells 224a–224n arranged in an array having columns 226a–226m and rows 228a–228n. The range-radial velocity matrix 222 is obtained by performing a Fourier transform across pulses, of the incoming signal, for each time sample as described above. A Doppler phase correction is applied to the resulting matrix. Finally, pulse compression in the range dimension is performed yielding the range-radial velocity matrix 222. The matrix 222 further includes a column of radial velocity values 232 at a range corresponding to a target location. The column of radial velocity values 232 includes a plurality of aliases 256a–256n corresponding to ambiguous velocities and the true radial velocity cell 254. The matrix 222 further includes a column of radial velocity values 240 corresponding to a noise cut. The column of radial velocity values 232 includes the target and a column of radial velocity values 240 does not include the target. The column of radial velocity values 240 corresponding to a noise cut is a representation of the noise in the system. The plurality of noise cut radial velocity values 240 are used to determine the signal to noise ratio.

After coherently integrating the received signals for each CPI and transforming the time domain data of the received signals into radial velocity cells the matrix 222 is formed. The matrix 222 includes possible targets having velocities from Vmin to Vmax and ranges from Rmin and Rmax. Using known constant false alarm rate techniques (CFAR), the system finds all the peaks 256a–256n which go above a predetermined threshold. The largest peak 254 is determined to be the true radial velocity value.

Figure 8:
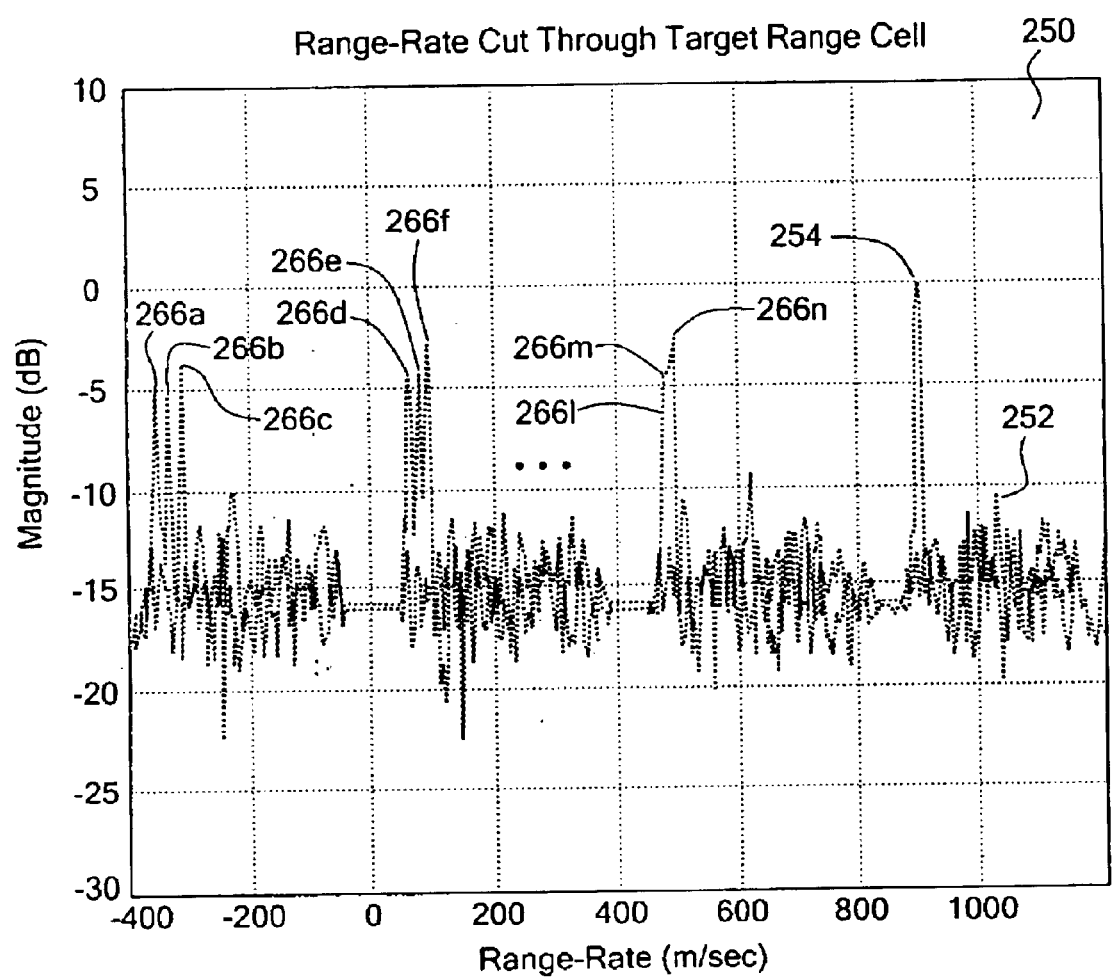
FIG. 8 is a graph of a processed return signal according to the invention and a graph of the corresponding noise.

Now referring to FIG. 8 in which like reference numbers indicate like elements of FIG. 7, a graph of a processed return signal 250 and a graph of the corresponding noise signal 252 are shown. Return peaks 266a–266n represent Doppler aliases. Return signal 250 is a velocity cut taken through the peak range cells, for example, column 232 (FIG. 7). In one example, an incoming target has a range-radial velocity of 900 m/sec and six different frequencies are used in the NCI. The system is set with a minimum range-radial velocity of −400 m/sec and a maximum range-radial velocity of 1200 m/sec covering approximately 4 Doppler zones of 400 meters per second. The largest signal to noise ratio occurs for the processed return signal 250 at return peak 254 at 900 m/sec. The smaller return peaks 266a–266n (marked by stars) are from the Doppler aliases and the peak 266a–266n positions are determined using Equation 16 (described below in conjunction with FIG. 9). The unambiguous range-radial velocity at return peak 254 is included in a target report.

Figure 9:
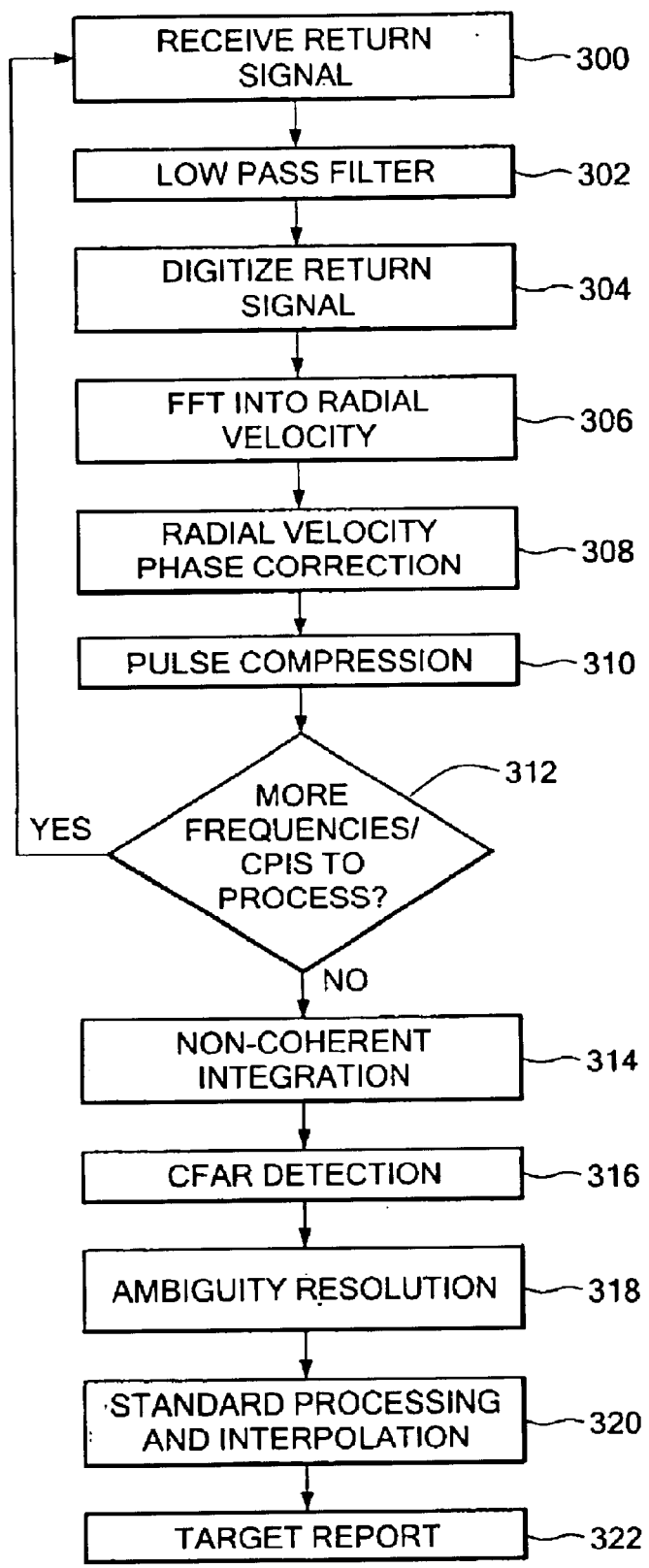
FIG. 9 is a flow diagram illustrating the steps to process received pulse Doppler radar signals using a variable frequency scale discrete Fourier Transform according to the invention.

Referring now to FIG. 9, a flow diagram illustrates an exemplary sequence of steps for processing target return signals from a series of coherent processing intervals (CPIs) having varying carrier frequencies in accordance with the present invention. In the flow diagrams of FIG. 9, the rectangular elements are herein denoted "processing blocks" (typified by element 300 in FIG. 9) and represent computer software instructions or groups of instructions. The diamond shaped elements in the flow diagrams are herein denoted "decision blocks" (typified by element 312 in FIG. 9) and represent computer software instructions or groups of instructions which affect the operation of the processing blocks. Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

At step 300, the radar system receives return signals in response to radar signals transmitted according to a predetermined frequency technique in accordance with the teaching of FIG. 3 or FIG. 10. At step 302 the returned signals are filtered using a low pass filter as is known in the art. At step 304 the filtered return signals are digitized and stored in a memory buffer.

At step 306, the received signals are transformed to the radial velocity scale using a discrete Fourier Transform having a variable frequency scale as described herein above. A range radial velocity matrix is formed with a first signal having a wavelength $\lambda_0$ (having an equivalent maximum frequency) is the shortest wavelength employed in the radar. Each return signal is processed by an FFT implementation of the discrete Fourier Transform having a variable frequency scale to provide the range radial velocity matrix.

In an embodiment where the transmitted signal included a variable PRF, a further step would be required to transform the received signals with frequency scaling based on the PRF and the carrier frequency. In this embodiment, the changing PRF is included in the calculation of the additional constant in the Fourier transform.

At step 308, phase corrections are calculated in radial velocity. Radial velocity phase correction provides relatively higher range resolution and signal to noise ratio because the replica for the pulse compression filter no longer needs to be tuned to the correct Doppler so distortion of the compressed pulse does not occur. At step 310 pulse compression is optionally used to direct additional energy at the target using longer signal pulses while retaining the resolution of shorter pulses. By performing the integration in radial velocity space, energy is saved by reducing spreading and providing better side lobes (i.e., reducing range straddle).

At step 312, it is determined whether there are any more CPIs to process. If there are more CPI's, processing resumes at step 300, otherwise processing continues at step 314. At step 314, each of the transformed return signals are non-coherently integrated by summing the processed signal magnitude (or magnitude squared depending on the Constant False Alarm Rate discriminator to be used) values in the range-radial velocity matrix which were normalized in radial velocity space by the transformation in step 306.

At step 316, constant false alarm rate techniques are use to detect the true and aliased target returns in radial velocity space. At step 318, the Doppler aliases are removed, in one embodiment, by applying the following Equation:

$$\Delta \dot{r}_m^{alias} = \Delta \dot{r}^{true} + \eta N \left( \frac{\lambda_m}{\lambda_{\min}} \right) \Delta \dot{r} \quad \text{(Equation 21)}$$

where $\Delta \dot{r}^{true}$ is the return with the highest signal-to-noise ratio at that range and η is an integer, either positive or negative.

In the embodiment where the transmitted signal included a variable PRF, a further step would be required to resolve any possible ambiguities in the range dimension At step 320 the return signal is processed using known techniques and at step 322 a target report is computed.

Now referring to FIG. 10, an alternative transmitted radar signal 424 includes a plurality of successive burst sequences 426a–426n (generally referred to as burst sequences 426) including a plurality of transmit pulses and a plurality of corresponding receive intervals following each of the plurality of transmit pulses. In one embodiment, each burst sequence has a different pulse repetition frequency (PRF) and a different carrier frequency at which the pulses 128a1–128nn are transmitted. The processing for the pulse compression in this embodiment, utilizes the Fourier transform of Equations 2, and 3 or Equations 12 and 13 to provide the same number of range samples in the matrix and the changing PRF is included in the calculation of the additional constant in the DFT. The transmitted signals can further include either frequency modulated (FM) chirp or binary phase modulated waveforms.

It should now be appreciated, using the above described techniques takes advantage of integrating multiple CPIs to achieve higher sensitivity and the advantage of wide (a few hundred MHz per CPI) frequency diversity to enhance target cross section and mitigate RF multipath interference. Further, such techniques provide non-coherent integration to enhance signal detectability without the need for extensive post processing of the radar return signals to align signal Doppler frequencies.

It will further be appreciated that the invention is not limited to radar applications, and that a signal processor coupled to a receiver, for example a communications receiver, could process received signals using a discrete Fourier Transform having a variable frequency scale. Such an apparatus includes a transmitter which transmits a signal to a receiver having a first series of pulses having a first coherent processing interval and a second series of pulses having a different carrier frequency and having a second coherent processing interval, and the receiver would be adapted to receive and integrate the transformed signals.

All publications and references cited herein are expressly incorporated herein by reference in their entirety.

Having described the preferred embodiments of the invention, it will now become apparent to one of ordinary skill in the art that other embodiments incorporating their concepts may be used. It will be appreciated by those of ordinary skill in the art that other transmitted radar signals can be used to detect target range and velocity in conjunction with the present invention. It is felt therefore that these embodiments should not be limited to disclosed embodiments but rather should be limited only by the spirit and scope of the appended claims.

What is claimed is:

1. A method for processing pulse Doppler radar signals to detect a target comprising:

transmitting radar signals from a radar system, the radar signals being transmitted according to a predetermined frequency technique;

receiving signals within a frequency band, including a target return signal having a frequency indicative of the velocity of the target; and transforming the target return signal into a range radial velocity matrix using a Fourier Transform having a variable frequency scale.

2. The method of claim 1 wherein the Fourier Transform includes a discrete Fourier Transform.

3. The method of claim 2 further comprising resolving ambiguous velocities and wherein the predetermined frequency technique further includes signals having frequency diversity.

4. The method of claim 3 wherein resolving ambiguous velocities includes applying a phase shift weighting function on the return signal such that a DFT phasor is aligned in different regions of the velocity domain.

5. The method of claim 3 wherein resolving ambiguous velocities includes:

aligning the radial velocity matrix for non-coherent integration;

identifying a plurality of detections which occur from Doppler aliases; and removing Doppler aliases from the plurality of detections.

6. The method of claim 1 wherein transmitting radar signals comprises transmitting a plurality of pluses for providing dwell integration having frequency diversity.

7. The method of claim 6 wherein the plurality of pluses includes a plurality of coherent processing intervals (CPIs) each having a different carrier frequency.

8. The method of claim 7 wherein transforming the target return signal using a Fourier Transform having a variable frequency scale comprises Doppler frequency normalization for the plurality of CPIs.

9. The method of claim 1 wherein the Fourier transform is provided as a Fast Fourier Transform (FFT).

10. The method of claim 9 wherein the Fourier transform is given by:

$$X_p(k) = \sum_{n=0}^{N-1} x_p(n) e^{\left( \frac{-2\pi j n k d_i}{N} \right)}$$

where n is the pulse repetition interval (PRI) index;

N is the number of pulses in a CPI;

k is the frequency increment index;

p is the time sample index;

$X_p(k)$ is the frequency domain of a function, with time index p, frequency index k; and $x_i(n)$ are the return signal input samples for each coherent processing interval ($CPI_i$);

k=closest integer to $$\frac{2vTN}{\lambda_0};$$

and $$d_i = \frac{\lambda_0}{\lambda_i}.$$

11. The method of claim 9 wherein the Fourier transform is given by:

$$X_P(k) = \sum_{n=0}^{N-1} x_p(n) e^{-2\pi j M d_i n} e^{\left(\frac{-2\pi j n k d_i}{N}\right)}$$

where

M=the order of target velocity ambiguity (any positive or negative integer);

n is the pulse repetition interval (PRI) index;

N is the number of pulses in a CPI;

k is the frequency increment index p is the time sample index;

$X_p$ (k) is the frequency domain of a function, with time index p, frequency index k; and $x_p$ (n) are the return signal input samples for each coherent processing interval ($CPI_i$);

k=closest integer to $$\frac{2vTN}{\lambda_0};$$

and $$d_i = \frac{\lambda_0}{\lambda_i}.$$

12. The method of claim 9 wherein the Fourier transform is given by:

$$\Psi_{p,k,m} = \sum_{n=1}^{N} \psi_{p,n,m} e^{-i 2\pi \left(\frac{n-1}{N}\right)(k-1)\left(\frac{\lambda_{min}}{\lambda_m}\right)}$$

where:

n is a pulse repetition interval (PRI) index;

m is a coherent processing interval (CPI) index;

N is the number of pulses in a CPI;

k is a frequency increment index;

p is a time sample index;

$\Psi_{p,k,m}$ is a frequency domain of a function, having time index p, frequency index k and CPI index m;

$\lambda_{min}$ is a predetermined minimum operating wavelength;

$\lambda_m$ is an operating wavelength; and $\Psi_{p,n,m}$ is the time domain return signal, at time sample p, PRI n, and CPI m.

13. The method of claim 12 further comprising selecting a minimum velocity corresponding to $c/\lambda_{min}$.

14. The method of claim 1 further comprising non-coherently integrating coherent processing intervals (CPIs).

15. The method of claim 1 further comprising reducing a post-processing non-coherent integration target spread in Doppler.

16. The method of claim 1 further comprising correcting radial velocity phase correction for providing a relatively higher range resolution by reducing a requirement to match the pulse compression filter to the target Doppler.

17. The method of claim 1 further comprising correcting radial velocity phase correction for providing a relatively higher signal to noise ratio.

18. The method of claim 2 further comprising resolving ambiguous velocities and wherein the predetermined frequency technique further includes signals having a plurality of varying pulse repetition frequencies (PRF).

19. The method of claim 1 wherein transforming the return signal using a Fourier transform having a variable frequency scale comprises transforming the target return signal directly into radial velocity.

20. The method of claim 1 further comprising:

filtering the target return signal with a clutter notch filter;

filling the clutter notches to a predetermined noise level;

aligning a notch filtered radial velocity matrix for non-coherent integration; and integrating the signals from the notch filtered radial velocity matrix for detecting the target such that the obscuration of the target return by the clutter notch alias is substantially reduced.

21. A method for normalizing a plurality of target returns from CPIs of varying carrier frequency for a target having ambiguous velocity comprising:

transforming the plurality of target returns into a radial velocity matrix, the transformed returns having a cyclical component corresponding to the varying carrier frequencies of the CPIs;

detecting the target returns;

identifying detections occurring from Doppler aliases; and removing the detections occurring from Doppler aliases.

22. The method of claim 21 wherein identifying detections occurring from Doppler aliases comprises aligning the target returns in the radial velocity matrix.

23. A radar system comprising:

a receiver adapted to receive signals within a frequency band, including a target return signal having frequency indications of the target's velocity; and a signal processor coupled to said receiver including a radial velocity Fourier transformer for transforming the target return signal into a radial velocity matrix.

24. The system of claim 23 further comprising a non-coherent integrator.

25. The system of claim 23 further comprising an ambiguity resolver.

26. The system of claim 23 further comprising a radial velocity phase corrector.

27. The system of claim 23 further comprising a clutter notch filter.

28. An apparatus comprising:

a transmitter adapted to transmit a first series of pulses having a first coherent processing interval and a second series of pulses having a different carrier frequency and having a second coherent processing interval;

a receiver adapted to receive signals within a frequency band, and a signal processor coupled to said receiver including a radial velocity Fourier transformer for transforming the received signals using a discrete Fourier Transform having a variable frequency scale.

* * * * *

UNITED STATES PATENT AND TRADEMARK OFFICE
CERTIFICATE OF CORRECTION

PATENT NO. : 6,828,929 B2
APPLICATION NO. : 10/354511
DATED : December 7, 2004
INVENTOR(S) : Barbella et al.

It is certified that error appears in the above-identified patent and that said Letters Patent is hereby corrected as shown below:

Col. 1, line 49-50, delete "is moving towards from the" and replace with -- is moving towards the --.

Col. 2, line 41, delete "target signal" and replace with -- target signal --.

Col. 3, line 2, delete "(NCI), other" and replace with -- (NCI. Other --.

Col. 4, line 67, delete "DFT" and replace with -- DFT --.

Col. 5, line 36, delete "γhd iis the" and replace with -- $\gamma_i$ is the --.

Col. 6, line 38, delete "the i in subscript the" and replace with -- the i subscript in the --.

Col. 7, line 54-55, delete "the first the velocity" and replace with -- the first velocity --.

Col. 8, line 44, delete "$\Delta f^d$'s is shown." and replace with -- $\Delta^{fd}$'s is shown. --.

Col. 8, line 64, delete "equation 2" and replace with -- Equation 2 --.

Col. 9, lines 8-9, delete "different notation" and replace with -- different notations --.

Col. 9, lines 25-26, delete "at a different carrier frequencies." and replace with -- at different carrier frequencies. --.

Col. 9, line 45, delete "which is be used for all" and replace with -- which is used for all --.

Col. 11, line 14, delete "using a using a radial" and replace with -- using a radial --.

Col. 11, line 43, delete "using the by the radial" and replace with -- using the radial --.

Col. 11, line 65, delete "equation 13." and replace with -- Equation 13. --.

Col. 14, line 31, delete "herein above." and replace with -- hereinabove --.

Col. 14, line 56, delete "CPI's," and replace with -- "CPIs, --.

Col, 14, line 64, delete "are use" and replace with-- are used --.

UNITED STATES PATENT AND TRADEMARK OFFICE
CERTIFICATE OF CORRECTION

PATENT NO. : 6,828,929 B2
APPLICATION NO. : 10/354511
DATED : December 7, 2004
INVENTOR(S) : Barbella et al.

It is certified that error appears in the above-identified patent and that said Letters Patent is hereby corrected as shown below:

Col. 15, line 10, delete "dimension At step 320" and replace with -- dimension. At step 320 --.

Col. 16, line 24, delete "pluses" and replace with -- pulses --.

Col. 16, line 26, delete "pluses" and replace with -- pulses --.

Col. 17, line 12, delete "increment index" and replace with -- increment index --.

Signed and Sealed this

Twenty-seventh Day of March, 2007

JON W. DUDAS
*Director of the United States Patent and Trademark Office*